United States Patent [11] 3,624,513

[72] Inventor John P. Costas
Fayetteville, N.Y.
[21] Appl. No. 6,769
[22] Filed Jan. 29, 1970
[45] Patented Nov. 30, 1971
[73] Assignee General Electric Company

[54] IMAGE FREQUENCY SUPPRESSION CIRCUIT

8 Claims, 6 Drawing Figs.

[52] U.S. Cl. 325/437
[51] Int. Cl. H04b 1/26
[50] Field of Search 325/388, 437, 474, 475

[56] References Cited
UNITED STATES PATENTS
3,070,747 12/1962 Addleman 325/437

*Primary Examiner*—Robert L. Richardson
*Attorneys*—James J. Williams, Frank L. Neuhauser, Oscar B. Waddell and Joseph B. Forman

ABSTRACT: In a heterodyne circuit, an input signal is applied to an adder circuit which produces an intermediate frequency signal. Suppression of the image frequency is provided by a feedback loop connected between the output and an input of the adder circuit. In the feedback loop, the image frequency is cancelled by negative feedback and replaced by the complex conjugate of the desired frequencies. The complex conjugate is added coherently to the input signal at the adder. Image suppression is determined by the gain of the feedback loop.

INVENTOR:
JOHN P. COSTAS,

BY James J. Williams
HIS ATTORNEY.

INVENTOR:
JOHN P. COSTAS,
BY James J. Williams
HIS ATTORNEY.

INVENTOR:
JOHN P. COSTAS,

BY James J. Williams
HIS ATTORNEY.

IMAGE FREQUENCY SUPPRESSION CIRCUIT

BACKGROUND OF THE INVENTION

My invention relates to an improved image frequency suppression circuit, and particularly to an improved image frequency suppression circuit for use in a superheterodyne radio receiver.

My invention herein described was made in the course of or under a contract or subcontract thereunder with the Navy Department.

The designer of a superheterodyne-type of radio receiver typically makes many compromises which depend on the specific application for the receiver. In deciding on the first intermediate frequency (IF), the designer may choose a zero value (i.e., one in which a local oscillator is beat with the incoming signal frequency to produce the usable intelligence frequency,) this being synchronous detection which has no image-response problem. However, if a nonzero first IF is selected, the designer will find that there are many factors which influence the choice of the IF. In most if not all cases, the dominant problem of image frequency response inevitably becomes a controlling or an important factor. A technique which would significantly alleviate the image frequency response problem would be useful, since the designer could choose an IF that better satisfies other pressing requirements of the receiver application.

Accordingly, an object of my invention is to provide a new and improved image frequency suppression circuit that is particularly useful in superheterodyne receivers.

One known technique for image frequency suppression might be described as the single-sideband phasing approach. In this technique, inphase and quadrature detections of the radiofrequency (RF) signal are made with some convenient IF value being chosen as the band center of the base band signal. Two IF channels are thus created which contain both upper sideband and lower sideband components. These two IF channels are shifted 90° in relative phase and added so that the upper or lower sideband signals may be selected for a final output centered at the IF value. This technique is similar to phasing a sideband signal with the audio frequency band centered at the selected IF. The problems of this particular technique for suppressing image frequencies become apparent once a few calculations are made. The rejection of the image frequency component depends critically upon both an amplitude and phase balance in the two IF channels. In effect, this technique is a bridge-balancing scheme where the depth of the null obtained is critically affected by both amplitude and phase errors. Signal-to-image frequency-rejection ratios in the order of 60 db's by phasing require some sort of closed loop control of the local oscillator phase, the channel amplitude, and the channel phase. In addition, this technique and its embodiments are relatively complex and are relatively difficult to maintain and operate.

Accordingly, another object of my invention is to provide an improved image frequency suppression circuit that does not require closed loop control of local oscillator phase, channel amplitude, and channel phase.

Another object of my invention is to provide an improved image frequency suppression circuit that is relatively simple in construction, that is relatively reliable in operation, and that is relatively easy to maintain.

SUMMARY OF THE INVENTION

Briefly, these and other objects are achieved in accordance with my invention by an image frequency suppression circuit having an adder. Incoming signals having desired or information frequencies and image frequencies are applied to a first input of the adder. A feedback loop is connected between the output of the adder and a second input of the adder. The feedback loop comprises local oscillators, mixers, and IF filters which suppress the image frequencies in the incoming signal by cancelling the image frequencies and replacing them with the complex conjugate of the desired frequencies. A further mixer is connected to the output of the adder and used with a further oscillator to produce an output signal that represents the desired or information frequencies of the incoming signal.

BRIEF DESCRIPTION OF THE DRAWING

The subject matter which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENTS

Figure 1:
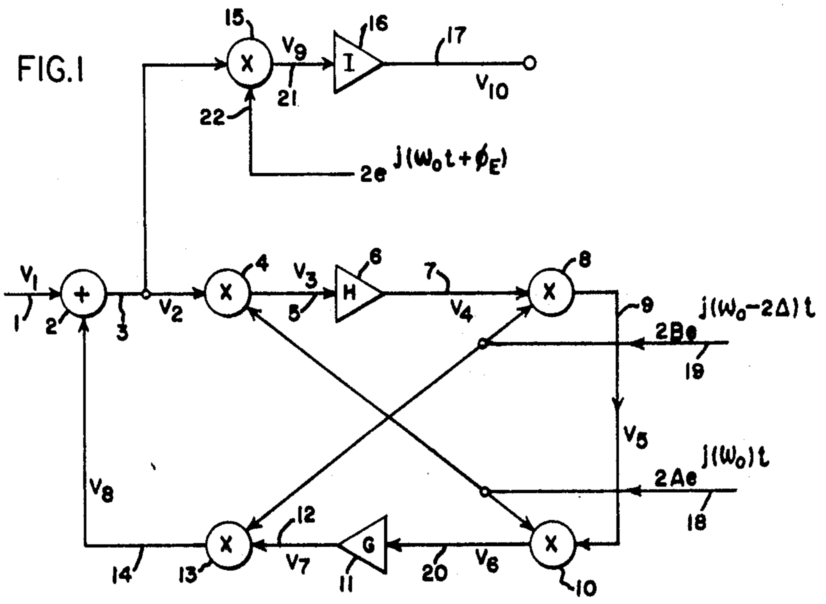
FIG. 1 shows a block diagram of a preferred embodiment of an image frequency suppression circuit in accordance with my invention.

With reference to FIG. 1, incoming signals indicated as $V_1$ are applied to a line 1 which is connected to a linear adder circuit 2. The output $V_2$ of the adder circuit 2 is supplied over a line 3 to a first mixer 4. The mixer 4 receives signals on a line 18 from a first oscillator and produces an output $V_3$ on a line 5 which is supplied to a filter amplifier 6. The output $V_4$ of the filter amplifier 6 is supplied over a line 7 to a second mixer 8. The mixer 8 is supplied with signals on a line 19 from a second local oscillator and produces an output $V_5$ on a line 9 which is connected to a third mixer 10. The mixer 10 receives signals on the line 18 from the first oscillator and produces a signal $V_6$ on a line 20 which is connected to a second filter amplifier 11. The output $V_7$ from the filter amplifier 11 is supplied by a line 12 to a fourth mixer 13 which also receives signals on the line 19 from the second oscillator. The output $V_8$ from the fourth mixer 13 is connected by a line 14 back to a second input of the adder 2. Output signals are derived from the line 3 and supplied to a fifth mixer 15 which receives signals on a line 22 from the first oscillator. Output signals $V_9$ from the fifth mixer 15 are connected by a line 21 to a third filter amplifier 16 which provides the output signals $V_{10}$ on a line 17. These output signals $V_{10}$ can be utilized in any way desired after being further amplified and detected (as in a conventional receiver). As will be explained, these output signals $V_{10}$ are relatively free of image frequency signals and contain principally or primarily only the desired or information frequencies preset in the input signal $V_1$ In the loop of FIG. 1, the desired signal is centered at $\omega_0+\Delta$, the image region is centered at $\omega_o-\Delta$, the IF (radian) is $\Delta$, and the main LO operates at $\omega_o$. An auxiliary local oscillator (ALO) signal operates at the frequency $\omega_o-2\Delta$.

The loop cancels image terms of $v_1$ at $v_2$ by use of high-gain feedback. Desired signal terms of $v_1$ are preserved at $v_2$ but the loop creates, in the image frequency region, a "lower sideband copy" of these desired signal terms. This requires that the final output $v_{10}$ be obtained from $v_2$ by a mixer operation. The operation will now be described in detail using a sinusoidal analysis. Desired signal and image signal terms will be carried through separately to demonstrate the loop treatment of each. In FIG. 1 items 11, 6, and 16 are filter amplifiers with band centers at $\Delta$, the IF. Items 4, 8, 10, 13, and 15 are mixers. Item 2 is a summing (linear adder) network.

Let the input signal $v_1$ on line 1 be written as $$v_1=a_L e^{j(\omega_o-\Delta+\alpha)t}+a_u e^{j(\omega_o+\Delta+\beta)t} \quad (1)$$

where $a_L$ and $a_u$ are complex constants. The $a_L$ term of equation (1) represents an image signal at $\omega_o-\Delta+\alpha$ while the $a_u$ term of equation (1) represents the desired signal at $\omega_0+\Delta+\beta$. The voltage $v_2$ on line 3 is the sum from adder 2 of $$v_2=v_1+v_8 \quad (2)$$

where $v_8$ on line 14 is the feedback signal of the loop. Since H and I (items 6 and 16) pass only frequencies near $\Delta$, and since the mixers 4 and 15 are fed LO signals at frequency $\omega_o$, the only terms of consequence in $v_1$, $v_2$, and $v_8$ are those at $\omega_0-\Delta$ and $\omega_0+\Delta$.

An examination of FIG. 1 shows that mixer 13 is fed an ALO at $\omega_0-2\Delta$ on line 19, and a signal at $\Delta$ on line 12 (since G, item 11, passes only signals near $\Delta$.) Thus the only significant component of $v_8$ must fall at $\omega_0-\Delta$ which is the image frequency region. This means that the loop input is sensitive to both $\omega_0+\Delta$ and $\omega_0-\Delta$ inputs but the loop feedback can only be at $\omega_o-\Delta$.

Given equation (1) as the input $v_1$ note that the voltage $v_2$ must take the form $$v_2=c_Le^{j(\omega_o-\Delta+\alpha)t}+a_ue^{j(\omega_o+\Delta+\beta)t}+d_ue^{j(\omega_o-\Delta-\beta)t} \quad (3)$$

where $c_L$ and $d_u$ are undetermined complex constants. The $c_L$ term of equation (3) is the resultant image term formed by the $a_L$ term of equation (1) adding with some $(\omega_o-\Delta+\alpha)$ term fed back by the loop via $v_8$.

The $a_u$ term of equation (3) is identical to the corresponding term of equation (1). Since $v_8$ is effectively restricted to terms in the $\omega_o-\Delta$ region, the $\omega_o+\Delta+\beta$ term at $v_2$ must come entirely from $v_1$.

The $d_u$ term of equation (3) is generated by the $a_u$ term of $v_1$ and $v_2$. However this $\omega_o-\Delta-\beta$ term comes entirely from $v_8$ since no such frequency is present in $v_1$. The undefined constants $c_L$ and $d_u$ will be found now by loop analysis. Since G, H, and I are assumed centered at $\Delta$ let the transfer functions G, H, and I be $$G(\omega)=G(\Delta+X)=G(X) \quad (4)$$

where $X$ is the radian frequency measured from $\Delta$. Voltage $v_2$ on line 3 is mixed with the LO on line 18 in mixer 4 and filtered by H to produce $v_4$ on line 7. Thus $$v_4=c_L^*AH(-\alpha)e^{j(\Delta-\alpha)t}+a_uA^*H(\beta)e^{j(\Delta+\beta)t}+d_u^*AG(\beta)e^{j(\Delta+\beta)t} \quad (5)$$

where $A$ is a complex constant and the asterisks indicate complex conjugate. Note now that $v_4$ mixes with the ALO on line 19 in mixer 8 to produce $v_5$ on line 9. Only the sum frequency terms of $v_5$ are of interest and they are $$v_5=c_L^*ABH(-\alpha)e^{j(\omega_o-\Delta-\alpha)t}+a_uA^*BH(\beta)e^{j(\omega_o-\Delta+\beta)t}+d_u^*ABH(\beta)e^{j(\omega_o-\Delta+\beta)t} \quad (6)$$

The above voltage is mixed with the LO of line 18 in mixer 10 to produce $v_6$ on line 20. Voltage $v_6$ is then filtered by $G$ of item 11 to produce $v_7$ $$v_7=c_LA^*B^*H^*(-\alpha)G(\alpha)Ae^{j(\Delta+\alpha)t}+a_u^*AB^*H^*(\beta)AG(-\beta)e^{j(\Delta-\beta)t}+d_uA^*B^*H^*(\beta)AG(-\beta)e^{j(\Delta-\beta)t}$$

Comparing $v_4$ of equation (5) and $v_7$ of equation (7) shows that a frequency inversion about $\Delta$ has been accomplished from line 7 to line 12.

Voltage $v_7$ is mixed in line 13 with the ALO of line 19 with the sum frequency term being the component of $v_8$ of interest; thus $$v_8=c_LA^*B^*H^*(-\alpha)G(\alpha)ABe^{j(\omega_o-\Delta+\alpha)t}+a_u^*AB^*H^*(\beta)AG(-\beta)Be^{j(\omega_o-\Delta-\beta)t}+d_uA^*B^*H^*(\beta)AG(-\beta)Be^{j(\omega_o-\Delta-\beta)t} \quad (8)$$

Now, the constants $A$ and $B$ represent LO and ALO amplitude and phase. Let $$A=e^{j\phi_A} \quad (9)$$

and $$B=e^{j\phi_B} \quad (10)$$

which permits equation (8) to be rewritten as $$v_8=d_uH^*(\beta)G(-\beta)e^{j(\omega_o-\Delta-\beta)t}+a_u^*H^*(\beta)G(-\beta)e^{j2\phi_A}e^{j(\omega_o-\Delta-\beta)t}+c_LH^*(-\alpha)G(\alpha)e^{j(\omega_o-\Delta+\alpha)t} \quad (11)$$

Now combine equations (11), (1), and (2) considering first the $\omega_o-\Delta-\beta$ terms.

$$d_u=d_uH^*(\beta)G(-\beta)+a_u^*H^*(\beta)G(-\beta)e^{j2\phi_A} \quad (12)$$

or $$d_u=\frac{e^{j2\phi_A}H^*(\beta)G(-\beta)}{1-H^*(\beta)G(-\beta)}a_u^* \quad (13)$$

Now consider the $\omega_o-\Delta+\alpha$ terms.

$$c_L=a_L+c_LH^*(-\alpha)G(\alpha) \quad (14)$$

or $$c_L=\frac{a_L}{1-H^*(-\alpha)G(\alpha)} \quad (15)$$

The coefficients $c_L$ and $d_u$ of equations (15) and (13) may be substituted into equation (3) to give the loop response $v_2$ for a given input $v_1$.

The actual output is, however, taken from line 17 as $v_{10}$. Let mixer 15 input on line 22 be the LO signal of line 18 shifted by 90° or $\pi/2$ radians. Then $$\Phi_E=\Phi_A+\pi/2 \quad (16)$$

and the output at $v_{10}$ becomes $$v_{10}=\frac{a_L^*e^{j\phi_E}I(-\alpha)e^{j(\Delta-\alpha)t}}{1-H(-\alpha)G^*(\alpha)}+a_ue^{-j\phi_E}I(\beta)\left\{\frac{1-2H(\beta)G^*(-\beta)}{1-H(\beta)G^*(-\beta)}\right\}e^{j(\Delta+\beta)t} \quad (17)$$

It is useful at this point to review the results obtained with some simplifications. The loop gain $H^*G$ may be considered for the moment to be a large negative number for a range of frequencies in the pass band of the loop. That is $$H^*G\approx-K \text{ and } K>>1 \quad (18)$$

For frequencies which equation (18) holds, equations (13), (15), and (3) may be rewritten as $$d_u\approx-e^{j2\phi_A}a_u^* \quad (19)$$

$$c_L\approx\frac{a_L}{K} \quad (20)$$

$$v_2\approx\frac{a_L}{K}e^{(j\omega_o-\Delta+\alpha)t}+a_ue^{j(\omega_o+\Delta+\beta)t}-e^{j2\phi_A}a_u^*e^{j(\omega_o-\Delta-\beta)t} \quad (21)$$

Comparing equation (21) with equation (1) it is seen that the loop suppresses the image by feedback. The amount of suppression is roughly equal to the loop gain K. The signal term causes the loop to produce a lower sideband copy such that a double sideband (DSB) resultant occurs which is at a null phase relative to the LO on line 18 and mixer or product detector 4.

If it is assumed for the moment that the output filter 16 has the same response as the open loop $$I(X)=H(X)G^*(-X) \quad (22)$$

then equation (18) combined with equation (17) yields $$v_{10}\approx-a_L^*e^{j\phi_E}e^{j(\Delta-\alpha)t}+2Ka_ue^{-j\phi_E}e^{j(\Delta+\beta)t} \quad (23)$$

Comparing equation (23) with equation (1) shows that the signal-to-image improvement is $2K$ or the loop gain plus 6 db.

An investigation of the coherence problem of signal and image will now be made. Note in the previous work that the image and signal were spaced differently from the LO so that two distinct frequencies were created in the loop. If the image is below the LO by exactly the same frequency that the signal is above, then only one frequency is created. It will be shown that coherence such as this does not change matters. The loop still treats signal and image components as if they were separate infrequency and distinguishable.

Let $$v_1 = a_L e^{j(\omega_o - \Delta - \beta)t} + a_u e^{j(\omega_o + \Delta + \beta)t} \quad (24)$$

so that the image and signal IF's will be identical and equal to $\beta$. Then a $v_2$ must be obtained of the form $$v_2 = c_L e^{j(\omega_o - \Delta - \beta)t} + a_u e^{j(\omega_o + \Delta + \beta)t} \quad (25)$$

Solving for $c_L$ by the same methods as used before obtain $$c_L = \frac{a_L}{1 - H^*(\beta)G(-\beta)} + \frac{e^{j2\phi_A} H^*(\beta)G(-\beta)}{1 - H^*(\beta)G(-\beta)} a_u^* \quad (26)$$

Now compare equations (25) and (26) with equations (3), (13), and (15) with $\beta$ in the latter three equations set to $-\beta$. It will be noted that identical expressions for $v_2$ result and thus coherence between image and signal is unimportant.

Figure 3:
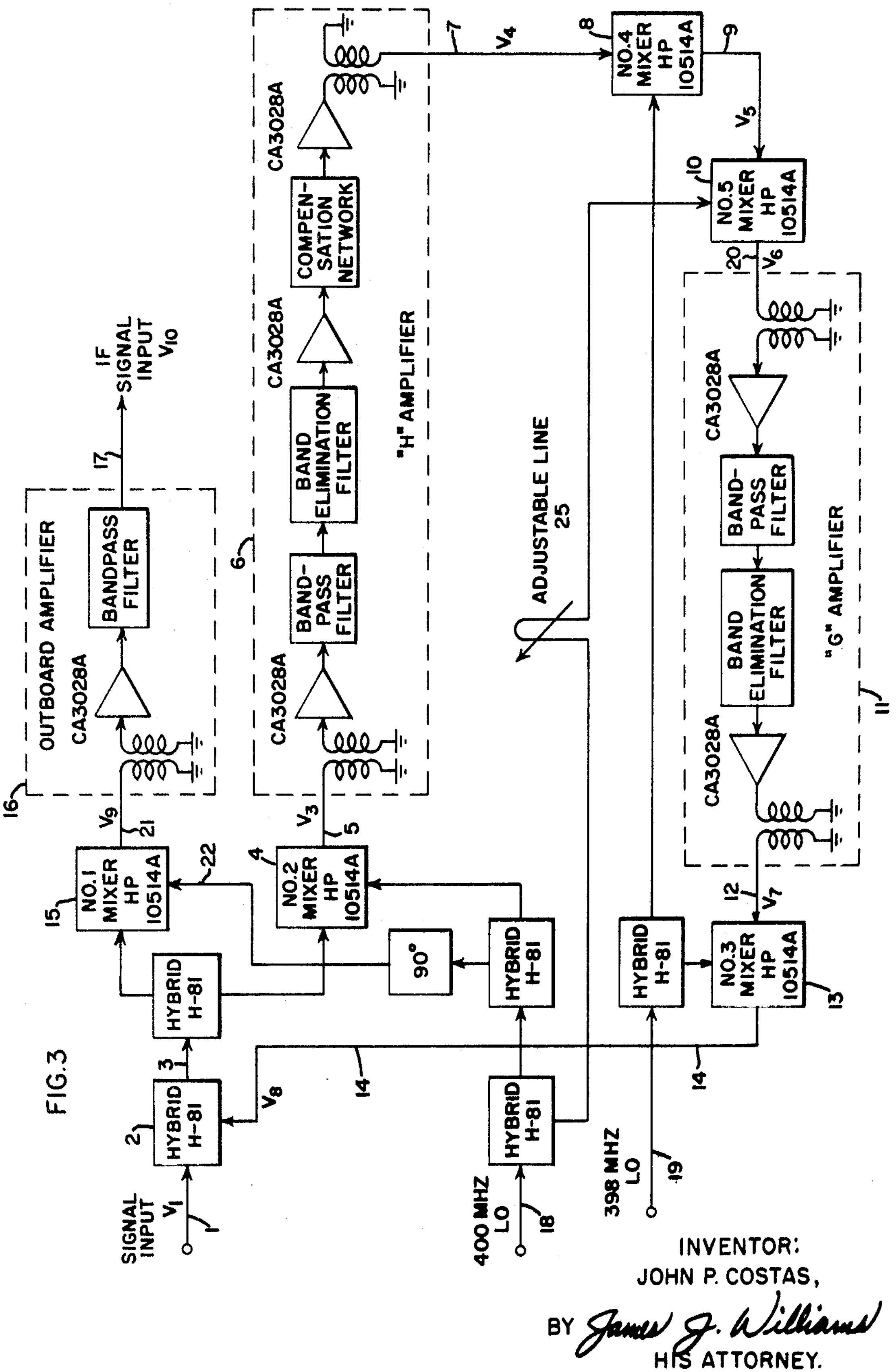
FIG. 3 shows a block diagram of a constructed embodiment of the image frequency suppression circuit of FIG. 1.

The above result leads directly to the conclusion that the loops of FIGS. 1 or 3 may be cascaded for additional image rejection. The $v_2$ output of FIG. 3 would be connected to the $v_1$ input of the loop following. Only the last loop in the chain would require the output mixer 15 and filter amplifier 16. A cascade of N-loops would yield a signal-to-image output voltage ratio of approximately $$2\prod_{j=1}^{N} |K_j| \quad (27)$$

where $K_j$ is the loop gain of the $j^{th}$ loop.

A signal-to-image improvement factor (SIR) could be defined as the ratio of the output signal voltage to the output image voltage divided by the ratio of input signal voltage to the input image voltage. The SIR will be a function of frequency and may be obtained from equation (17) with $\alpha$ set equal to $-\beta$. One obtains for the SIR $SIR = 1 - 2H(\beta)G^*(-\beta)$ (28) This states in effect that a high gain bandwidth product of the open loop is desirable. Ideally, the H and G filters of FIG. 3 would have a flat response over the IF pass band of interest, with very steep drops to either side. Practically, such filters cannot be used due to the fact that the phase response resulting would adversely affect loop stability.

A numerical example of the situation discussed would perhaps be useful at this point. Consider a 100-cycle tone appearing at $v_4$ of FIG. 1 with an 800-cycle tone being used as the oscillator input for mixer 8. The output $v_5$ will then contain the frequencies 900 and 700 Hz. Mixer 10 operates with an LO input of 1,000 Hz., so that the output at $v_6$ will be at 100 Hz. and also at 300 Hz. The 300-Hz. component is due, of course, to a mixing with the undesired sideband of $v_5$ occurring at 700 Hz.

Filter G will pass mainly 1 100-Hz. component of $v_6$, but consider for the moment the effect of some residual 300 Hz. appearing at $v_7$ along with the 100 Hz. Mixer 13 is fed an LO signal at 800 Hz. This would normally produce a 900- and 700-Hz. pair at $v_8$. The presence of the 300-Hz. component of $v_7$ would cause a 500- and 1100-Hz. component pair of $v_8$ to be produced. The 1100-Hz. term will clearly fall at the signal frequency in contradition to the original intent of the design, thus difficulties can be expected. A trap therefore in filter G for 300-Hz. components is clearly in order.

The same argument may be used with regard to filter H. in normal operation the feedback signal $v_8$ will contain both 700- and 900-Hz. components. Mixer 4 is fed with LO signal of 1,000 Hz. so that $v_3$ will normally contain components at 100 Hz. and also at 300 Hz. If filter H passes any appreciable portion of the 300-Hz. component of $v_3$ one may argue as above to show that difficulties may be expected. Thus filter H also should have an attenuation region at 300 Hz.

To reduce the unwanted frequency effects described above, traps were installed in filters H and G for 300 Hz. Specifically a zero-pole pair was introduced with the zero falling near the imaginary axis at 300 Hz. with the pole further to the left and at the same frequency as zero. This zero-pole pair provided the necessary attenuation at 300 Hz., yet did not introduce any significant phase shift near the crossover frequency of the loop. In this manner the 300-Hz. problem was accsmmodated without deleterious effects to loop stability.

It will be noted that the output filter amplifier 16 of FIG. 1 is external to the feedback loop. Therefore, its characteristics may be almost any shape desired. Steep cutoff regions are certainly not excluded. Equation (28) shows that a high open-loop gain should be maintained over the frequency range of interest at $V_{10}$. In most applications, the filter amplifier 16 will have a more narrow and sharper cutoff than the filter amplifiers 6 and 11.

Figure 2:
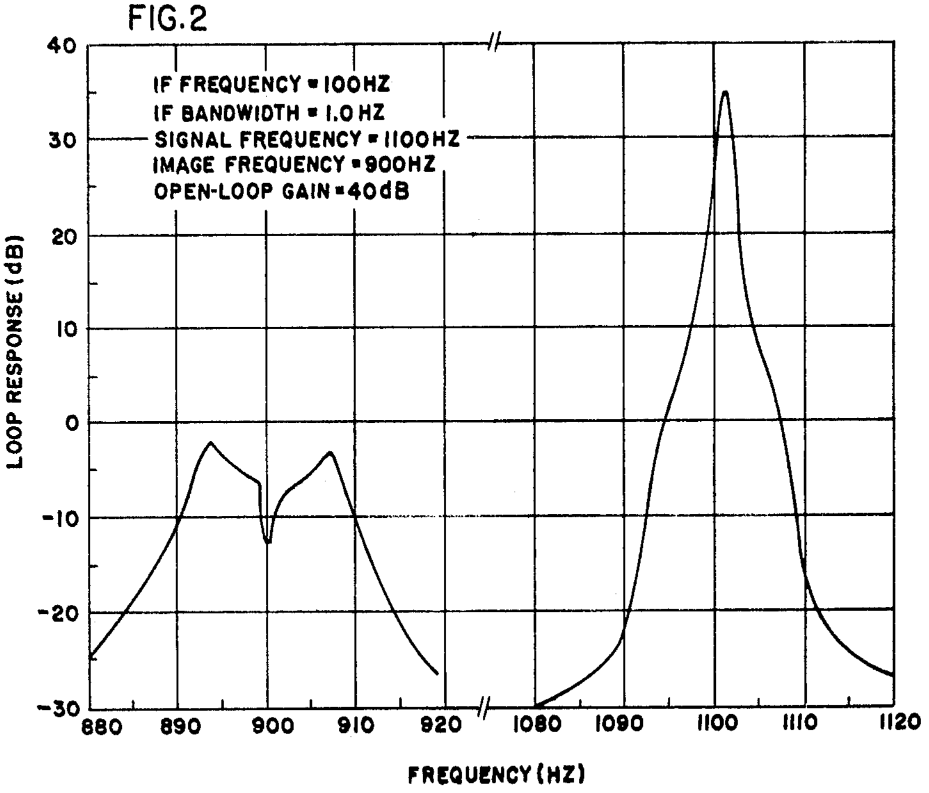
FIG. 2 shows a waveform illustrating computed results obtained with the image frequency suppression circuit of FIG. 1.

The image frequency rejection circuit shown in FIG. 1 has been simulated on an analog computer. In this simulation, the frequency of the first oscillator, connected to the line 18, was 1,000 Hertz, and the frequency of the second oscillator connected to the line 19 was 800 Hertz. The IF frequency was 100 Hertz, and the IF bandwidth was approximately 1,000 Hertz. These values resulted in a desired signal frequency being centered at 1100 Hertz, and an image frequency being centered at 900 Hertz. FIG. 2 shows the results of this simulation. With reference to FIG. 2, the loop response was measured in db's at the line 17, while the frequency of a constant amplitude signal was varied at the input line 1. The break in the frequency axis of FIG. 2 shows the response in the image-frequency region on the left and the response of the desired signal-frequency region on the right. Since the bandwidth of the open loop and the third filter amplifier 16 was made less than 1 Hertz, the actual frequency regions of interest are the narrow bands at 900 and 1,100 Hertz. The curve of FIG. 2 shows that approximately a 41.5 db. signal-to-energy improvement ratio was obtained, this being 4.5 db. below the theoretical value. The shoulders in the image-frequency response of FIG. 2 occur at the crossover frequencies of the loop. The height of these shoulders is indicative of the degree of phase margin obtained in the loop as a study of equation (17) will show. Actually, this is not too important, since the significant part of the loop performance is determined by the relative responses at 1,100 and 900 Hertz.

After the simulation illustrated in FIG. 2, the circuit of FIG. 1 was constructed and tested. FIG. 3 shows a block diagram of this circuit with portions having the same reference numerals as the corresponding portions in FIG. 1. The circuit of FIG. 3 is substantially similar to the circuit of FIG. 1 except that an adjustable line 25 was provided for the oscillator signals connected to the mixer 10. This was necessary to adjust the phase shift introduced into the loop by transmission delay in the electrically long coax lines physically necessary in the circuit. This phase shift affected the loop stability as can readily be seen, e.g., in a Nyquist gain-phase plot of a band pass circuit. With any significant gain, phase addition can rotate the plot eventually to a position which will encompass the critical point. It was found that the adjustable line section can be inserted in an RF line section in the loop or local oscillator input branch. This technique for loop phase adjustment would not be satisfactory for an operational receiver, because the relative phase would be sensitive to the frequency of operation. This problem could be solved in an operational receiver by making the oscillator distribution system form a bridge circuit, with each leg having the same line length. Microstrip transmission lines on the same ceramic substrates as the active devices could be used for this purpose. The requirement for phase adjustment can be overcome by careful design and packaging.

It was originally intended to operate with a loop of 40 db. gain. However, the circuit of FIG. 3 was found to be unstable with gains greater than approximately 32 db. Inasmuch as little information would be lost in determining the loop feasibility, no effort was expended to modify the circuit for stability at higher loop gains. With reference to FIG. 3, loop gain was measured by breaking the loop at the output of the filter amplifier 6, driving the mixer 8 with a 1-MHz. signal, and loading the output of the filter amplifier 6 into an additional terminated mixer.

Figure 4:
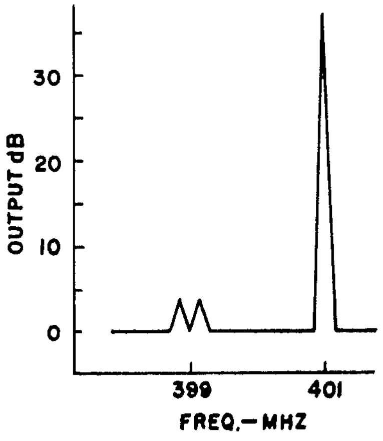
FIG. 4 shows a waveform illustrating a result obtained with the image frequency suppression circuit of FIG. 3.

The image suppression, with loop gain set to 28 db., was −33 db. for a 401-MHz signal and a 399-MHz. image measured at the output of the amplifier 16. FIG. 4 shows the output response to a swept RF input. The decreased signal suppression on either side of the 399-MHz.-image signal measured −28 db. at the peaks. These peaks occurred approximately ±53 kHz. from the image frequency, thus translating to a signal offset ±53 kHz. from loop band center. These frequencies are in the gain crossover region where loop suppression is insignificant; hence reliance for attenuation is placed on the outboard circuit filter. By narrowing the output filter amplifier 16 and sharpening the skirts, the ridges could be reduced significantly.

Figure 5:
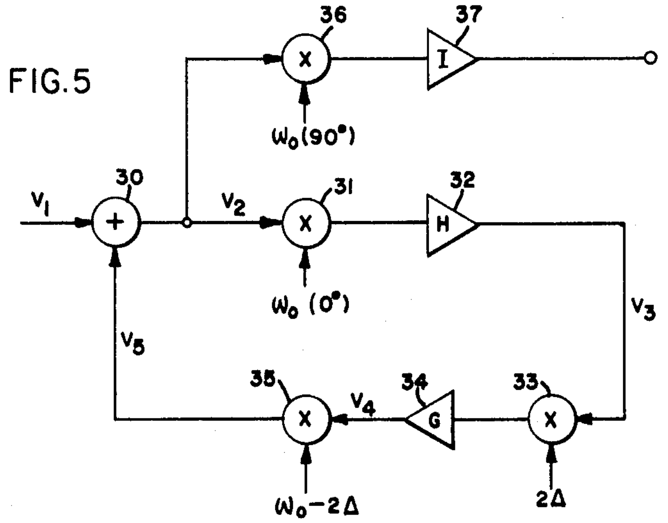
FIG. 5 shows a block diagram of another embodiment of an image frequency suppression circuit in accordance with my invention.

While the image frequency suppression circuits of FIGS. 1 and 3 perform satisfactorily, it will be noted that five mixers and three filter amplifiers are required. Accordingly, I have provided a second embodiment of my invention as shown in FIG. 5. FIG. 5 utilizes a linear adder 30 to which an input signal $V_1$ is applied. The output signal $V_2$ of the adder 30 is supplied to a first mixer 31, which is also supplied with a first local oscillator signal. The output of the first mixer 31 is applied to a filter amplifier 32 which produces an output signal $V_3$. This signal $V_3$ is supplied to a second mixer 33 with a second local oscillator signal. The second mixer 33 produces a signal which is applied to a filter amplifier 34. The output signal $V_4$ is applied to a third mixer 35 along with a third local oscillator signal. The output $V_5$ of the third mixer 35 is supplied to another input of the adder 30. Output signals $V_2$ are derived from the adder 30 and applied to a fourth mixer 36 along with a local oscillator signal. This fourth mixer 36 is connected to an output filter amplifier 37. While the circuit of FIG. 5 requires one less mixer than the circuit of FIGS. 1 and 3, the circuit of FIG. 5 requires an additional local oscillator.

The operation of the circuit of FIG. 5 will be explained in connection with the waveforms of FIGS. 6*a* through 6*e*.

Figure 6:
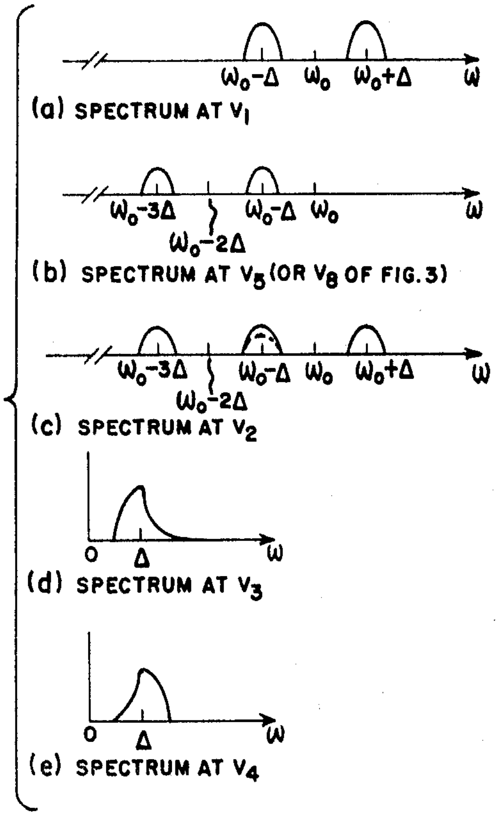
FIGS. 6*a* through 6*e* show wave forms illustrating the operation of the image frequency suppression circuit of FIG. 5.

For the purposes of illustration consider the input signal $v_1$ having a spectrum as shown in FIG. 6*a* Since filter amplifiers G, H, and I of FIG. 5 are assumed to be narrowband devices centered at radian frequency Δ, two input signal frequencies are of interest, the signal-frequency region centered at $\omega_o+\Delta$ and the image-frequency region centered at $\omega_o-\Delta$.

The input signal $v_1$ is summed with a loop feedback signal $v_5$ which has a spectrum as shown in FIG. 2. The mixer producing $v_5$ is fed with an LO signal at frequency $\omega_o-2\Delta$. This means that the output spectrum of $v_5$ will be confined to the regions $\omega_o-3\Delta$ and $\omega_o-\Delta$, since $v_4$ of FIG 5 has been filtered by amplifier G.

The signal $v_2$ of FIG. 5 results from a summation of the input signal $v_1$ and the loop feedback signal $v_5$. The spectrum of $v_2$ would then appear in some form similar to that shown in FIG. 6*c* with three components centered at $\omega_o-3\Delta$, $\omega_o-\Delta$ and $\omega_o+\Delta$. Note several things about the makeup of $v_2$. First, the spectral components at $\omega_o-3\Delta$ are introduced via $v_5$ and play no real part in loop operation since filters H and I of FIG. 5 pass only frequencies in the neighborhood of Δ radians per second. In this discussion, therefore, the component of $v_2$ centered at $\omega_o-3\Delta$ is of no importance and can be ignored.

Referring again to FIG. 6*c*, note that the component of $v_2$ at $\omega_o+\Delta$ is entirely due to the input signal $v_1$ and no significant contribution in this frequency region is made by the feedback signal $v_5$. This is an important point since, in effect, the feedback has been constrained to fall in the image-frequency region only.

The last component of $v_2$ falls at the image-frequency region $\omega_o-\Delta$ and, as indicated by FIG. 6*c*, this component is made up of two parts. The input signal $v_1$ was assumed to have a component at $\omega_o-\Delta$ representing the image input terms. The feedback signal $v_5$ will have a component at $\omega_o-\Delta$ indicated by FIG. 6*b*. Thus, the resultant spectral components of $v_2$ in the neighborhood of $\omega_o-\Delta$ arise from a summation of input signal $v_1$ and feedback signal $v_5$.

The signal $v_2$ is mixed with the LO signal $\omega_o$ at 0° phase, and the mixer output is filtered by H as shown to produce $v_3$. The spectrum of $v_3$ is shown symbolically in FIG. 6*d* by a purposely nonsymmetric drawing. Note that the spectrum of $v_3$ represents a foldover of the two components in FIG. 6*c* at $\omega_o-\Delta$ and $\omega_o+\Delta$.

Signal $v_3$ now enters a mixer fed with an oscillator signal at twice the IF center frequency. The output of this mixer is filtered by G to produce the same frequency Δ. Thus, the combined operations of the mixer fed with 2Δ and the filter G of FIG. 5 result in nothing more than a frequency-inversion of the spectrum of $v_3$ about the IF Δ as shown in FIG. 6*e*. Now $v_4$ mixes with an oscillator frequency $\omega_o-2\Delta$ to produce the signal $v_5$ of FIG. 6*b* as discussed previously. The loop is thus closed.

The final output signal is obtained from $v_2$ by a mixing operation involving the LO signal $\omega_o$ shifted by 90°. This is followed by a filtering operation as indicated by I of FIG. 5. The 90° phase shift involved the outboard mixer operation is not at all critical.

It will thus be seen that my invention provides new and improved image frequency suppression circuits which have many advantages over prior image frequency suppression arrangements. My rejection loop depends upon loop gain rather than phase and amplitude balance for its rejection, and hence is far more reliable in operation and relatively simple to maintain. While I have shown only two embodiments of my invention, persons skilled in the art will appreciate that modifications may be made. For example, there appear to be no practical frequency limitations on my circuit, so that it can be used at almost any desired frequency although I have explained its operation only in connection with one frequency example. Therefore, while my invention has been described with reference to particular embodiments, it is to be understood that modifications may be made without departing from the spirit of the invention or from the scope of the claims.

What I claim as new and desire to secure by Letters Patent of the United States is:

1. An improved image frequency suppression circuit for passing a desired signal whose frequency is spaced a selected intermediate frequency in one direction from a local frequency, an for suppressing an image frequency spaced said selected intermediate frequency in an opposite direction from said local frequency, said suppression circuit comprising:

a. an adder circuit having first and second inputs and an output;

b. means connected to said first input of said adder circuit for applying input signals thereto;

c. a first oscillator for producing signals having substantially said local frequency;

d. a first mixer connected to said output of said adder circuit and to said first oscillator for producing signals having a frequency substantially equal to said intermediate frequency;

e. a second oscillator for producing signals having a frequency spaced substantially twice said intermediate frequency from said local frequency;

f. a second mixer connected to said first mixer and to said second oscillator for producing signals having a frequency substantially equal to said image frequency;

g. a third mixer connected to said second mixer and to said first oscillator for producing signals having a frequency substantially equal to said intermediate frequency;

h. a fourth mixer connected to said third mixer and to said second oscillator for producing signals having a frequency substantially equal to said image frequency;

i. means connecting the output of said fourth mixer to said second input of said adder circuit;

j. and a fifth mixer connected to said output of said adder circuit and to said first oscillator for producing output signals having a frequency substantially equal to said intermediate frequency, said output signals containing the intelligence of said desired signal.

2. The improved image frequency suppression circuit of claim 1 wherein said desired signal frequency is higher than said local frequency, said intermediate frequency is lower than said image frequency, and said second oscillator frequency is lower than said image frequency.

3. The improved image frequency suppression circuit of claim 1, and further comprising a first intermediate frequency filter serially connected between said first and second mixers, and a second intermediate frequency filter serially connected between said third and fourth mixers.

4. The improved image frequency suppression circuit of claim 1 wherein said desired signal frequency is higher than said local frequency, said intermediate frequency is lower than said image frequency, and said second oscillator frequency is lower than said image frequency; and further comprising a first intermediate frequency filter serially connected between said first and second mixers, and a second intermediate frequency filter serially connected between said third and fourth mixers.

5. An improved image frequency suppression circuit for passing a desired signal whose frequency is spaced a selected intermediate frequency in one direction from a local frequency, and for suppressing an image frequency spaced said selected intermediate frequency in an opposite direction from said local frequency, said suppression circuit comprising:

a. an adder circuit having first and second inputs and an output;

b. means connected to said first input of said adder circuit for applying input signals thereto;

c. a first oscillator for producing signals having substantially said local frequency;

d. a first mixer connected to said output of said adder circuit and to said first oscillator for producing signals having a frequency substantially equal to said intermediate frequency;

e. a second oscillator for producing signals having a frequency substantially twice said intermediate frequency;

f. a second mixer connected to said first mixer and to said second oscillator for producing signals having a frequency substantially equal to said intermediate frequency;

g. a third oscillator for producing signals having a frequency spaced substantially twice said intermediate frequency from said local frequency;

h. a third mixer connected to said second mixer and to said third oscillator for producing signals having a frequency substantially equal to said image frequency;

i. means connecting the output of said third mixer to said second input of said adder circuit:

j. and a fourth mixer connected to said output of said adder circuit and to said first oscillator for producing output signals having a frequency substantially equal to said intermediate frequency, said output signals containing the intelligence of said desired signal.

6. The image frequency suppression circuit of claim 5 wherein said desired signal frequency is higher than said local frequency, said intermediate frequency is lower than said image frequency, and said third oscillator frequency is lower than said image frequency.

7. The improved image frequency suppression circuit of claim 5 and further comprising a first intermediate frequency filter serially connected between said first and second mixers, and a second intermediate frequency filter serially connected between said second and third mixers.

8. The improved image frequency suppression circuit of claim 5 wherein said desired signal frequency is higher than said local frequency, said intermediate frequency is lower than said image frequency, and said third oscillator frequency is lower than said image frequency; and further comprising a first intermediate frequency filter serially connected between said first and second mixers, and a second intermediate frequency filter serially connected between said second and third mixers.

* * * * *